March 17, 1964  J. J. KRAVETZ ETAL  3,124,832
CHICKEN PICKING FINGER
Filed Jan. 17, 1961

INVENTORS
JOHN J. KRAVETZ &
ARNOLD W. MacALONAN
BY Alfred C. Body
ATTORNEY

3,124,832
CHICKEN PICKING FINGER

John J. Kravetz and Arnold W. MacAlonan, Bedford, Ohio, assignors to The Stalwart Rubber Company, Bedford, Ohio, a corporation of Ohio
Filed Jan. 17, 1961, Ser. No. 83,294
9 Claims. (Cl. 17—11.1)

This invention pertains to the art of chicken picking, and more particularly to an improved finger for use in chicken picking.

In the art of chicken picking, it is conventional to support a plurality of soft rubber fingers on a pair of reels or drums having spaced parallel axes. The feathered body of a chicken, turkey or other fowl suspended from an overhead conveyor is then passed between these reels. The reels rotate at speeds on the order of 400 to 600 r.p.m. and the fingers move at relatively high lineal velocities, both towards and away from the fowl and each other. These fingers strike the fowl with considerable impact and are dragged across the body to pull out the feathers.

As the fingers move, they tend to become wedged in the V notch formed by the body or leg and the carcass. As they are then forcefully pulled out of the V notch, they are subjected to extremely high tension forces, which forces subject the fingers to excessive amounts of stretching, sometimes beyond the breaking strength of the finger itself. Even if the finger is not stretched beyond its breaking point, the repeated stretchings fatigue the elastic properties of the rubber, resulting in a breakage of the finger before it is otherwise worn out.

So that the fingers will not bruise the body of the fowl under the high impact forces necessarily involved in an operation of this type, they must be made of a very soft, but high tensile strength rubber. For mounting the fingers on the reel or drum, they have been provided with a base portion made of a somewhat harder and less elastic rubber vulcanized in a butt joint to the soft rubber of the finger. This harder base did not stretch or deform as much under the tension forces developed on the fingers, and was easier to hold in the supporting openings on the reels or drums. Difficulty has been experienced, however, with the vulcanized bond between the soft rubber of the finger portion and the harder rubber of the base portion breaking under the severe tension strains imposed on the fingers during operation.

These problems more recently have been aggravated by a desire on the part of the operators of the chicken picking machines to increase the productivity of such machines by increasing the speed of rotation of the reels and by positioning the reels closer together, both of which steps simply increase the problems heretofore experienced. In particular, with the reels moved closer together, the fingers of one reel tend to become intertwined with the fingers of the other reel as they move past each other and breakages of the fingers become more frequent. Inasmuch as the rate of production of a single chicken picking machine is extremely high, it is obvious that any stoppage of the machine in order to replace broken fingers can be a serious detriment to the overall productivity of such a machine.

The present invention contemplates a new and improved chicken picking finger which overcomes all of the above referred to difficulties and others, and provides a finger which has increased resistance to breakage, which has a minimum tendency to intertwine with the fingers of the opposite reel, which will have a life expectancy limited only by the wear characteristics of the rubber, and which is economical to manufacture.

In accordance with the present invention, a chicken picking finger is provided comprised of an elongated member of a soft elastic material, such as rubber, having embedded therein over at least portions of its length, a flexible, non-elastic, high tensile strength material so arranged as to prevent or limit longitudinal stretching of the finger under tension forces. With such an arrangement, the flexibility of the finger is unaffected but the repeated stretching of the finger and the resultant fatigue breakings are reduced or prevented.

If the flexible elastic material is longitudinally straight, any longitudinal stretching of the elastic material is generally prevented. The flexible non-elastic material can, however, in accordance with one phase of the invention, have waves or undulations in a transverse direction, in which case the finger will have a limited degree of longitudinal stretching throughout its length depending upon the height of the waves and/or their pitch. The amount of longitudinal stretch in various portions of the finger may be controlled by varying the height and/or pitch throughout the longitudinal length of the finger.

Further in accordance with the invention, and in a somewhat more limited aspect, such flexible non-elastic material has an appreciable width in the plane transverse to the direction of movement of the finger. The result of this construction is to limit the flexibility of the finger in a direction transverse to its direction of movement while at the same time not affecting the flexibility of the finger in its principal direction of movement.

Further, a chicken picking finger is provided comprised of the finger portion proper of soft flexible elastic material and a base portion of a harder less elastic material as heretofore, but in accordance with the invention, with the line of vulcanization between the two materials extending generally longitudinally of the finger. With such an arrangement, the vulcanized joint not only has a greater area than with the conventional butt joint, but, in addition, the joint is under a shear stress rather than a tension stress as a result of tension forces on the finger. In the preferred embodiment of the invention, the harder less elastic material surrounds the base end of the soft elastic material of the finger like a sleeve with the softer material forming a core. Flexible non-elastic material could also be embedded in this harder material to further limit its elasticity.

The principal object of the invention is the provision of a new and improved chicken picking finger whose useful life will be determined by the wear characteristics of the rubber and not by the breakage characteristics of the rubber.

Another object of the invention is the provision of a new and improved chicken picking finger having increased resistance to breakage.

Another object of the invention is the provision of a new and improved chicken picking finger wherein the amount of stretching under tension forces in any portion of the finger may be predetermined.

Another object of the invention is the provision of a new and improved chicken picking finger having a flexible non-elastic material embedded therein and extending throughout the length thereof.

Another object of the invention is the provision of a new and improved chicken picking finger having maximum flexibility in its direction of movement and so as to be stiffened in directions transverse to its line of movement.

Another object of the invention is the provision of a new and improved chicken picking finger made of soft elastic rubber-like material which will not stretch or which will have limited and controlled stretch under tension forces.

Another object of the invention is the provision of a new and improved chicken picking finger wherein the vulcanized line between the harder material of the base and the more elastic material of the finger will not separate under high tension forces.

Another object of the invention is the provision of a new and improved chicken picking finger wherein the harder elastic material of the base is vulcanized to the softer elastic material of the finger in such a manner that the line of vulcanization is generally parallel to the tension forces imposed on the finger.

Still another object of the invention is the provision of a new and improved chicken picking finger wherein the harder material of the base surrounds the softer elastic material of the finger like a sleeve with the softer material as a core.

The invention may take physical form in certain parts and arrangement of parts, a preferred embodiment of which will be described in this specification and illustrated in the accompanying drawings which form a part hereof and wherein.

Figure 1:
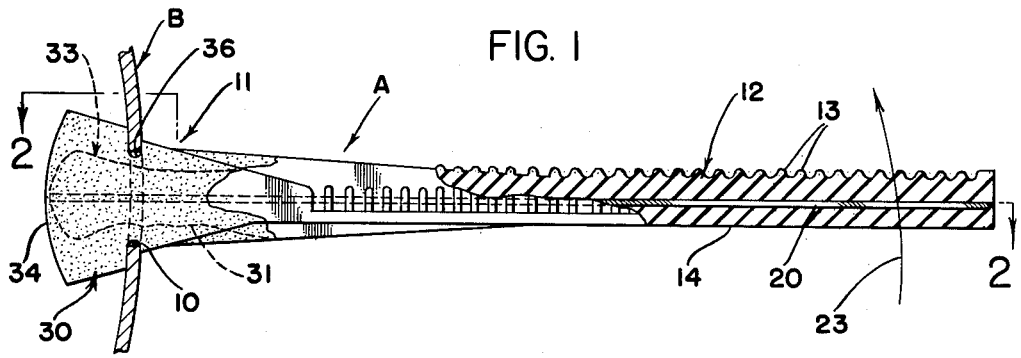
FIGURE 1 is a side elevational view, partly in section, showing a chicken picking finger illustrating a preferred embodiment of the invention.
Figure 2:
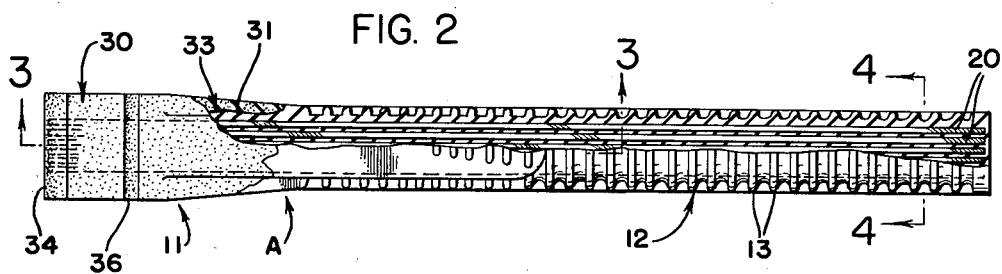
FIGURE 2 is a top elevational view, partly in section, taken approximately on the line 2—2 of FIGURE 1.
Figure 3:
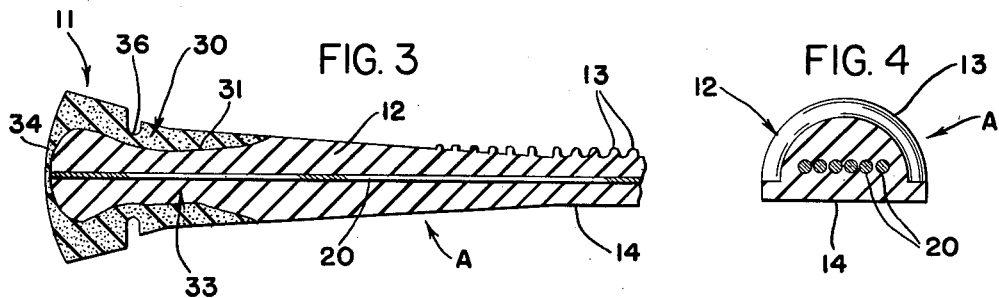
FIGURE 3 is a cross-sectional view of FIGURE 2 taken approximately on the line 3—3 thereof.

Referring now to the drawings wherein the showings are for the purposes of illustrating a preferred embodiment of the invention only, and not for the purposes of limiting same, the figures show what from the outside may be considered a conventional chicken picking finger A mounted in a conventional reel or drum B, only a fragmentary portion of which is shown in the drawings.

Figure 4:
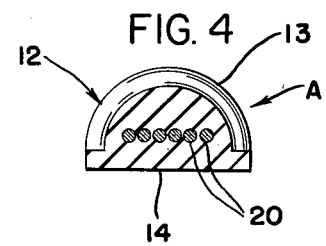
FIGURE 4 is an enlarged cross-sectional view of FIGURE 2 taken approximately on the line 4—4 thereof.

The drum B is generally of sheet metal or the like and has a plurality of generally rectangular openings 10 therethrough, each for supporting a finger A. Each finger A is generally comprised of a base portion 11 disposed within the opening 10 and a finger portion 12 proper extending radially outwardly from the drum B. The overall external shape of the finger A is conventional. The finger portion 12 in cross section (see FIGURE 4) is generally in the shape of a semicircle with the curved surface having a plurality of circumferentially extending longitudinally spaced ribs 13 formed along its entire longitudinal length. The flat surface 14 of the semicircle generally is also flat in a longitudinal direction.

The finger portion 12, as is conventional, is made of a soft, highly elastic, flexible material, such as pure gum rubber or the like.

As heretofore pointed out, such fingers in operation are subjected to large intermittent tensile forces which repeatedly stretch the soft material developing heat therein and lowering its tensile strength such that the elastic material breaks long before the ribs 13 have worn down smooth and the fingers must be replaced.

In accordance with the present invention, means are provided for preventing or limiting this repeated stretching of the finger portion 12. Such means may take a number of different forms, but in the preferred embodiment, are comprised of a plurality of strands 20 of a flexible, non-elastic high-tensile strength material embedded in the finger A throughout the entire length thereof and vulcanized to the elastic material such that tensile forces tending to stretch the finger portion 12 are transferred to the strands 20 and stretching of the finger portion 12 is thus prevented.

The strands 20 may take any one of a number of different forms, but in the preferred embodiment, are comprised of lengths of high tensile material such as twisted fibers of nylon or rayon so coated or processed that the elastic material will bond thereto during the process of molding the finger to its desired shape under heat and pressure. Such coated nylon or rayon strands are well known in the tire making industry and will not be described further herein.

In the preferred embodiment, there are a plurality of strands 20 all extending in close spaced parallel relationship and all arranged in a plane perpendicular to the line of movement 23 of the finger A when it is in operation. By placing the strands 20 in close spaced parallel relationship, the do not contact each other as the finger portion 12 flexes while in operation. There is thus no abrasion of one strand on the other. By placing the strands so that they are all arranged in a plane perpendicular to the line of movement 23, the strands tend to restrict the flexibility of the finger portion 12 in a direction transverse to this line of movement 23. Thus, when fingers on adjacent reels happen to strike each other, the tendency for such fingers to intertwine themselves is reduced. If only two strands are employed, they should have the maximum spacing. If the restriction on this flexibility is not desired, only a single strand need be employed.

While the strands 20 are shown as extending in spaced parallel relationship, they could be formed in the shape of a loosely or tightly woven ribbon if the abrasion of one strand on the other is not considered to be detrimental.

It will also be appreciated that the strands 20 could be of metal wire or metal chain or the like.

The strands 20 are shown as extending the full length of the finger A. It is to be noted that in the molding process, the elastic material will flow around and cover the ends of such strands.

Figure 5:
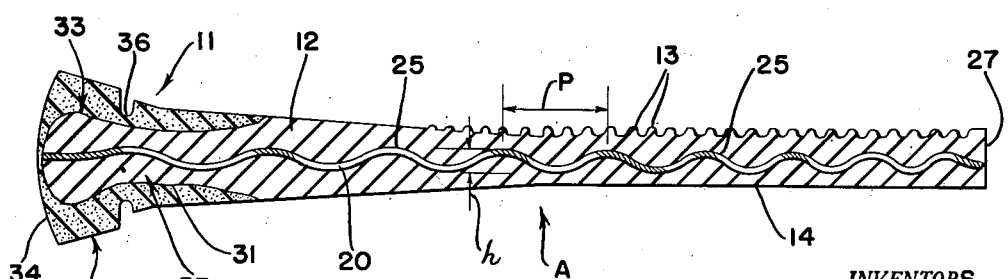
FIGURE 5 is a view similar to FIGURE 3 but showing an alternative embodiment of the invention.

The strands 20 in FIGURES 1–4 are generally straight and will prevent any appreciable stretching of the finger. FIGURE 5 shows an alternative arrangement whereby the finger will have a limited but controlled amount of stretching throughout its length. Thus the strands 20 have a series of undulations or waves 25 throughout their length, such undulations being in a direction transverse to the longitudinal length of the finger. When tension forces are applied to the finger, the finger stretches in limited amounts until the undulations have flattened out. Thereafter further stretching is prevented. The amount of this limited stretch is controlled by varying during the course of manufacture, the height "$h$" or pitch "P" or both of the undulations. In the embodiment shown, the undulations all have the same height but a pitch "P" decreasing progressively from the base 11 to the tip 27 of the finger portion 12 so that the finger may have increasing amounts of stretch progressively from the base 11 to the tip 27.

Using the strands 20 in accordance with the present invention, it has been possible to obtain chicken picking fingers having a greatly increased useful life limited primarily not by the breakage of the finger itself, but by the wearing down of the ribs 13 to a smooth surface, at which time the finger loses its effectiveness in pulling the feathers out of the body of the fowl. Also, the material of the finger portion 12 may be selected for its softness and its tensile strength may to a degree be neglected. Thus cheaper materials may be employed.

Further in accordance with the invention, the base portion 11 is formed of a material 30 of a harder, less resilient, less elastic material vulcanized to the material of the finger portion 12 along a vulcanizing line 31. This vulcanizing line 31 as may be seen from the figures, extends generally longitudinally of the finger. In the preferred embodiment, this harder, less elastic material 30 is in the form of a sleeve surrounding an inner core 33 of the softer, more elastic material of the remainder of the finger portion 12. In the embodiment of the invention shown, the material 30 extends transversely across the base end of the finger A as at 34, but it will be appreciated that the shape of this portion 34 will vary from finger to finger, depending upon the flow characteristics of the various materials during the molding process.

The vulcanized line 31 is a point of weakness in chicken picking fingers. With the vulcanized line 31 extending longitudinally, in accordance with the present invention, it will be appreciated that the vulcanized surfaces have a greater area than when the vulcanized line extends transverse of the finger. Further, the vulcanized line is in a state of shear, as a result of tension forces on the finger portion 12 as distinguished from the conventional vulcanized line which extends generally transversely of the finger and is in a state of tension as the result of tension forces on the finger 12.

As shown, the base portion 30 has notches 36 in its leading and trailing surface which engage the edges of the opening 10 of the reel B. This is conventional.

The fingers A are normally installed in the opening 10 by inserting the tip 27 of the finger portion 12 in the opening 10 from the inside of the reel B and then moving the finger radially outwardly until the edges of the openings are engaged in the notches 36.

The fingers A may be manufactured in a number of different ways. In the preferred manner of manufacture, an elongated rod of soft elastic rubber material is extruded in a conventional rubber extrusion press along with the reinforcing strands 20 which are introduced into the cavity of the extrusion press just prior to the time that the material enters the final extrusion die opening. The strands 20 are preferably forced into the extrusion press in the form of a flat band held in such relationship by a binder material which assists in the vulcanizing of the fibers to the rubber-like material. If the strands 20 are to have undulations, these undulations are formed in the strands either as the strands enter the cavity or just after and the strands are fed at a controlled rate so that the extrusion process does not remove the undulations.

The extruded rod is then cut to the desired length.

A short length of a harder, less elastic material is then wrapped around one end of the cut off rod. This assemblage is then placed in a die and subjected to heat and pressure for a period of time to cure the rubber of both the base portion 30 and of the finger portion 12 and to vulcanize the two rubbers together generally to the shape shown in the figures.

By virtue of the construction of the base 30, fractures on the vulcanizing line are completely eliminated.

By "flexible material" as used herein is meant a material which may be readily bent or curved under bending forces.

By "elastic material" as used herein is meant a material which can be readily stretched under tension forces and various rubbers and plastics may have varying relative degrees of elasticity depending on the base materials employed and the modifiers used.

By "soft" as used herein is meant a material which is readily compressed under compressive forces and varying rubbers or plastics may have varying degrees of softness depending on the base materials and the modifiers used.

The materials of the finger portion 12 and the base 30, their softness, elasticity or flexibility form no part of the present invention. The invention only deals with the use of non-elastic strands and the relationship of the vulcanizing between the base and finger portion.

Thus it will be seen that a chicken picking finger has been provided which accomplishes all of the objectives heretofore set forth and others, and provides a finger which will have a maximum life, will not be subject to breakage, and which has the maximum flexibility in the direction of movement and a restricted flexibility in a direction transverse to its line of movement.

The invention has been described with reference to a preferred embodiment. Obviously, modifications and alterations will occur to others upon a reading and understanding of this specification, and it is our intention to include all such modifications and alterations insofar as they come within the scope of the appended claims.

Having thus described our invention, we claim:

1. In a chicken picking finger comprised of a length of soft elastic flexible material, the improvement which comprises: at least one strand of flexible material extending generally along the length of said finger, embedded therein and bonded thereto, said strand having a high modulus of elasticity as compared to said soft material.

2. In a chicken picking finger comprised of an elongated length of soft elastic flexible material and adapted to move in a predetermined line of movement, the improvement which comprises: a ribbon of flexible fibers embedded in said material and bonded thereto, said ribbon extending over substantially the whole length of said material, the plane of said ribbon being generally perpendicular to said line of movement and said ribbon having a high modulus of elasticity as compared to said soft material.

3. In a chicken picking finger comprised of an elongated length of soft elastic flexible material having a mounting base of a harder less elastic flexible material vulcanized to said soft material, the improvement which comprises: the line of vulcanization between said two materials extending generally longitudinally of said finger.

4. In a chicken picking finger, an elongated length of soft elastic flexible material, a sleeve of harder, less elastic flexible material surrounding one end of said finger, and being vulcanized thereto to form a harder mounting base for the finger with the vulcanization line between said soft material and said less elastic material being substantially longitudinal of said finger.

5. The improvement of claim 1 wherein said length of strand has undulations in a direction transverse to the length of said elastic material.

6. The improvement of claim 5 wherein said undulations have a uniform pitch from end to end.

7. The improvement of claim 5 wherein said undulations have a decreasing pitch from one end of said finger to the other.

8. The improvement of claim 5 wherein said undulations have a uniform height from end to end of said finger.

9. The improvement of claim 5 wherein said undulations have a varying height from end to end of said finger.

References Cited in the file of this patent

UNITED STATES PATENTS

| | | |
|---|---|---|
| 965,293 | Gussenhoven | July 26, 1910 |
| 1,743,954 | Blake | Jan. 14, 1930 |
| 2,604,656 | Anderson et al. | July 29, 1952 |
| 2,683,282 | McKinley et al. | July 13, 1954 |
| 2,690,985 | Poole | Oct. 5, 1954 |
| 2,714,571 | Irion et al. | Aug. 2, 1955 |
| 2,758,334 | Adams et al. | Aug. 14, 1956 |
| 2,795,099 | Getsinger | June 11, 1957 |
| 2,914,794 | Barker et al. | Dec. 1, 1959 |
| 2,979,431 | Perrault | Apr. 11, 1961 |